United States Patent [19]
Blaisdell et al.

[11] Patent Number: 5,673,471
[45] Date of Patent: Oct. 7, 1997

[54] METHOD OF PRODUCING AN AIR BAG MODULE USING A RETRACTABLE AIR BAG RETAINING MEANS

[75] Inventors: Kenneth C. Blaisdell, Phoenix; James A. Dent, Chandler; Larry P. Hulsey, Peoria; Robert A. Rhinefrank, Phoenix, all of Ariz.

[73] Assignee: Automated Solutions, Inc., Phoenix, Ariz.

[21] Appl. No.: 527,493

[22] Filed: Sep. 13, 1995

[51] Int. Cl.⁶ .................................................. B23P 17/00
[52] U.S. Cl. .................... 29/423; 29/451; 53/589; 280/731
[58] Field of Search ............... 29/423, 451; 53/438, 53/529, 399, 589; 280/731, 733

[56] References Cited

U.S. PATENT DOCUMENTS

| 4,605,456 | 8/1986 | Annis, Jr. ............................ | 53/399 |
| 5,236,329 | 8/1993 | Sylvester ............................. | 53/589 |
| 5,414,980 | 5/1995 | Shibazaki et al. .................. | 53/589 |
| 5,562,301 | 10/1996 | Lutz ................................... | 280/731 |

*Primary Examiner*—David P. Bryant
*Attorney, Agent, or Firm*—Parsons & Goltry; Robert A. Parsons; Michael W. Goltry

[57] ABSTRACT

A folded air bag retaining apparatus for retaining a folded air bag coupled to a reaction plate in a folded configuration during the positioning of a cover. The apparatus including a holding fixture for supporting the reaction plate and the folded air bag coupled to the reaction plate, in a position to receive the enclosing cover, and a flexible band for retaining the folded air bag in a folded configuration until after the enclosing cover is positioned to enclose the folded air bag and the enclosing cover is coupled to the reaction plate.

9 Claims, 6 Drawing Sheets

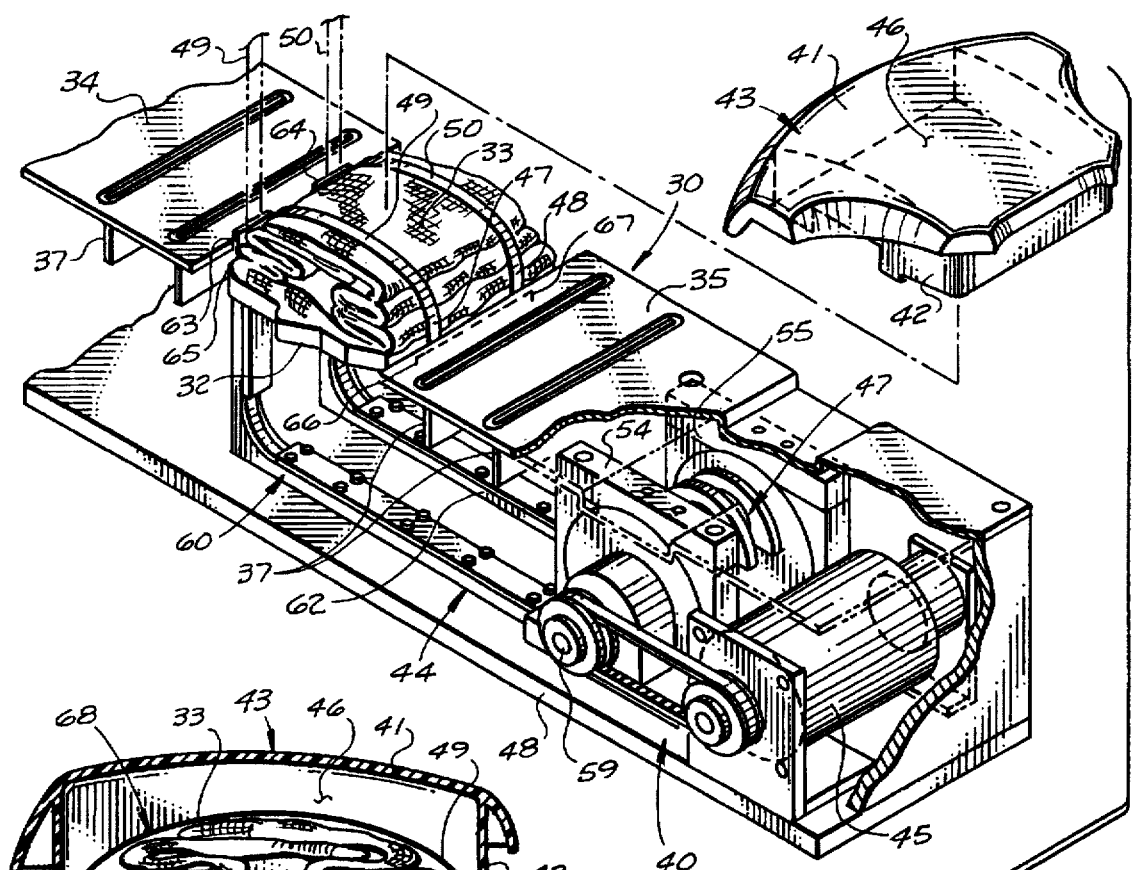
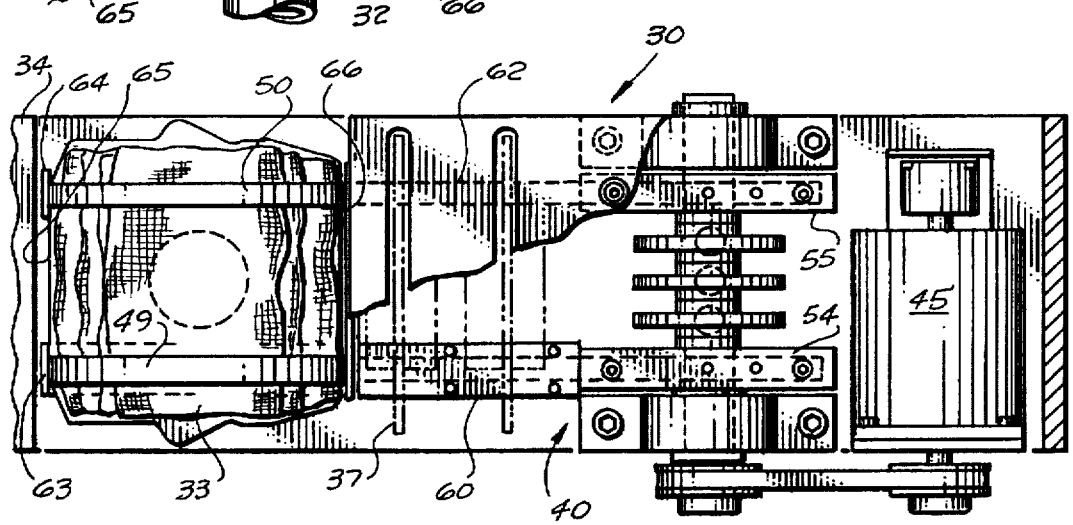

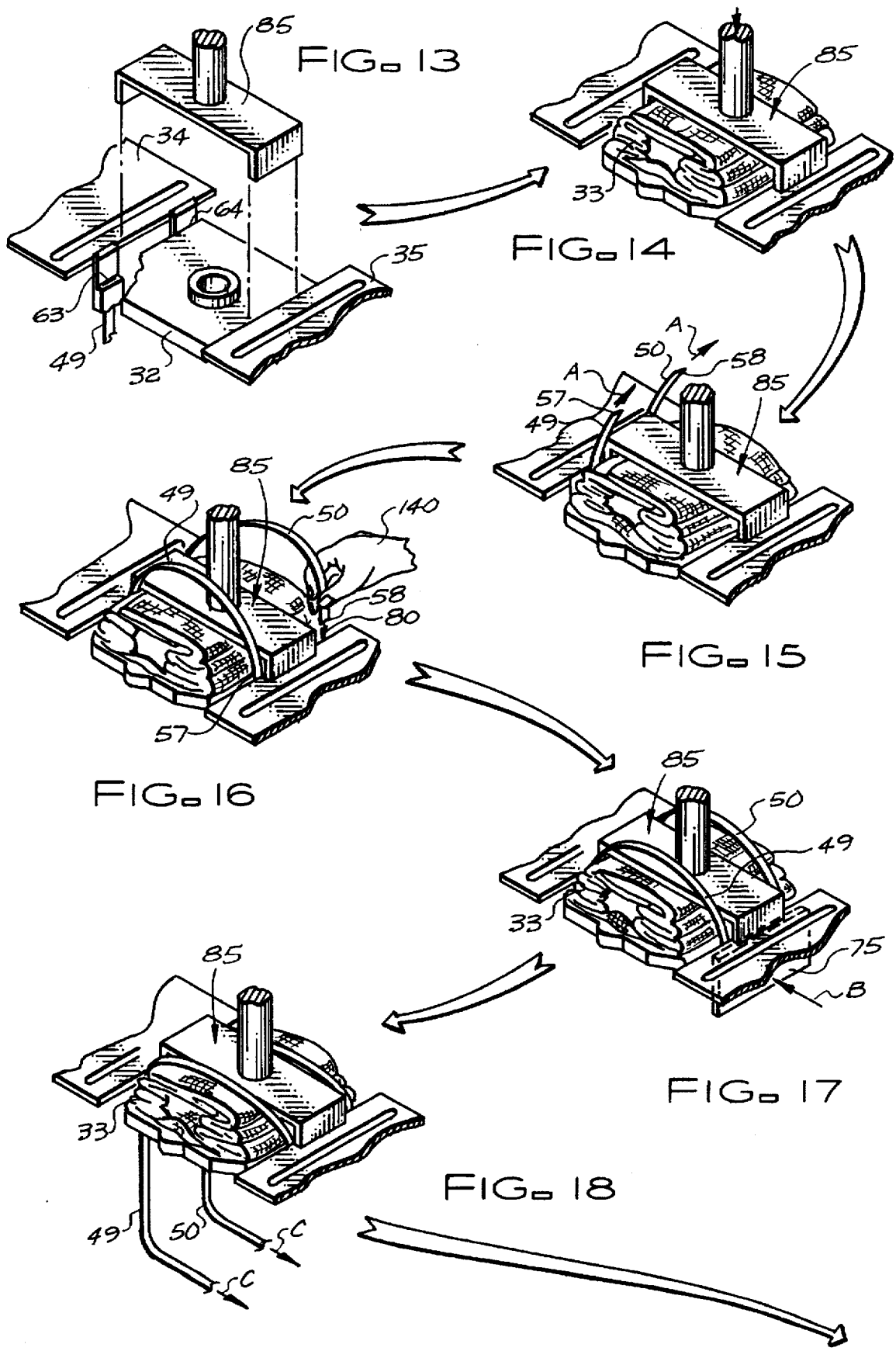

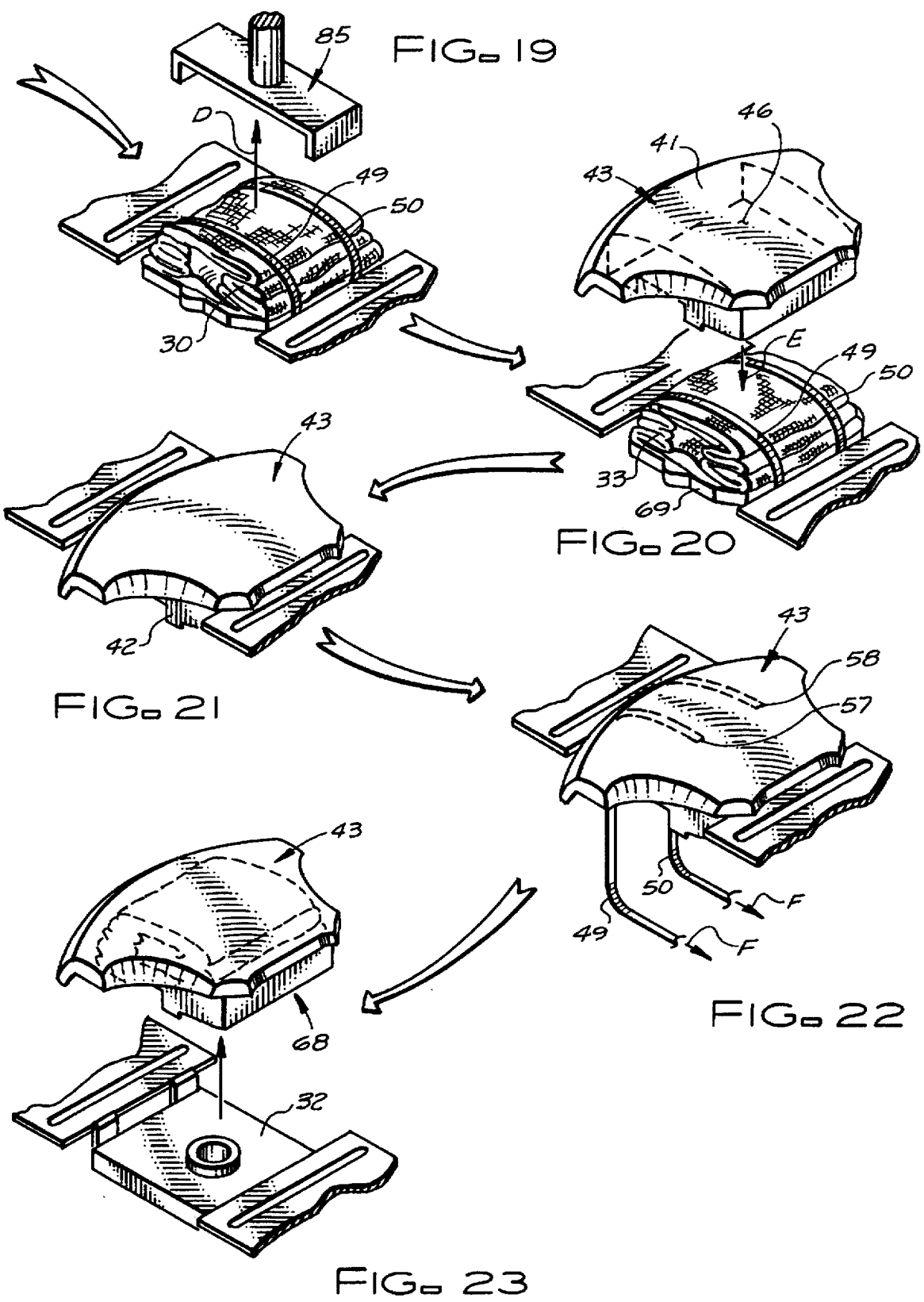

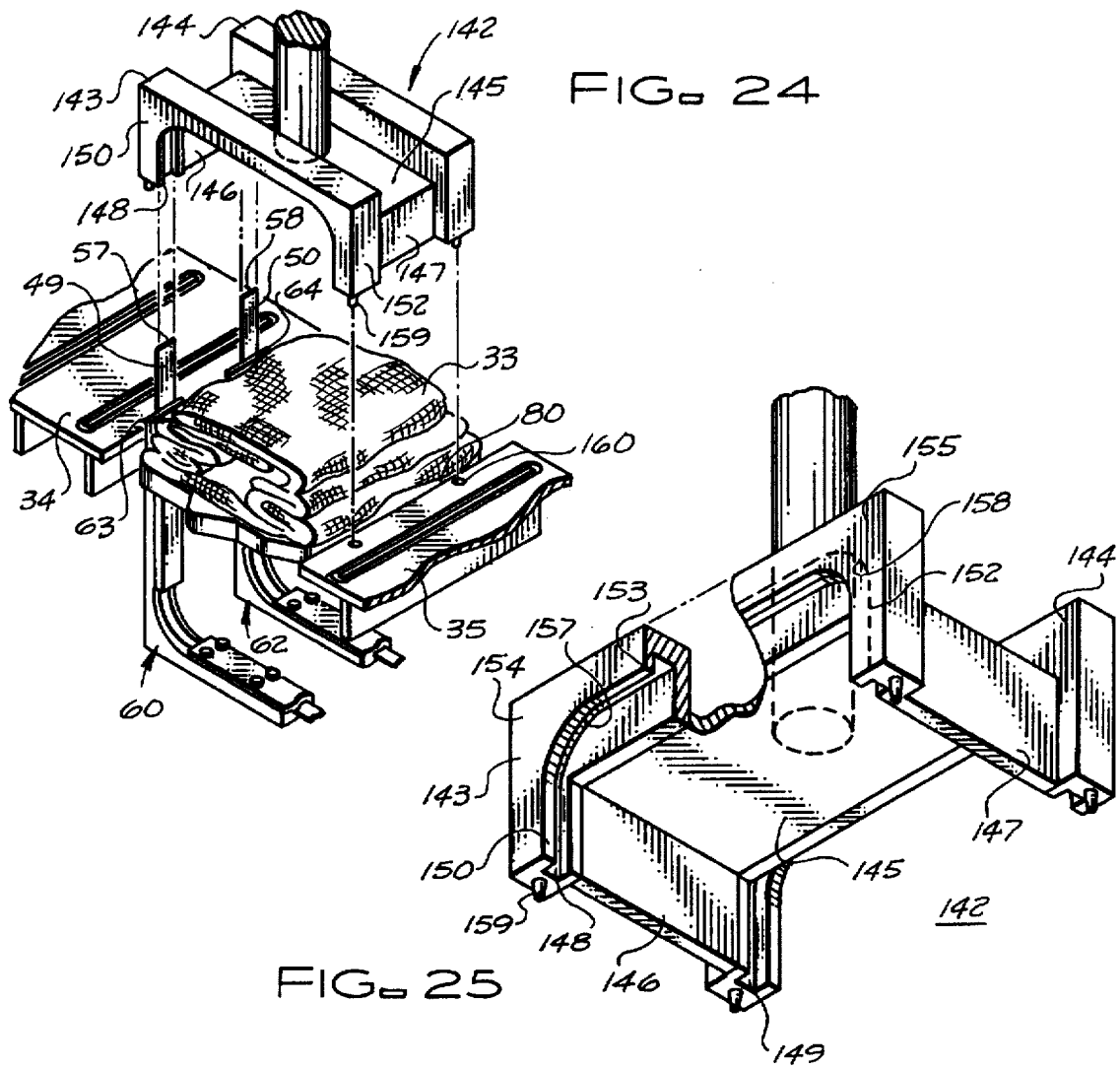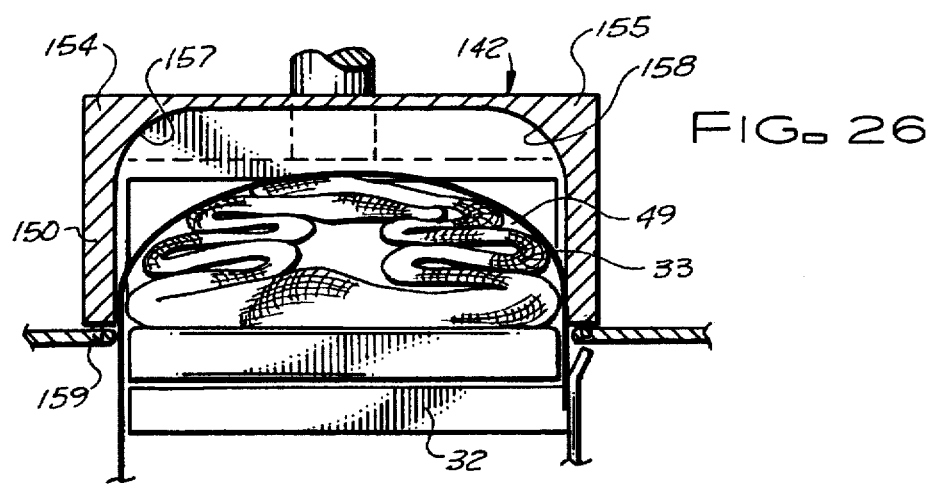

METHOD OF PRODUCING AN AIR BAG MODULE USING A RETRACTABLE AIR BAG RETAINING MEANS

BACKGROUND OF THE INVENTION

1. Field of the Invention

This invention relates to bag folding devices.

More particularly, the present invention relates to automated devices used in folding air bags.

In a further and more specific aspect, the instant invention concerns covering a folded air bag to complete an air bag module ready for installation in a vehicle.

2. Prior Art

Vehicular air bags are among the latest safety enhancements for automobiles and other vehicles. Their use is increasing dramatically with a corresponding demand for lower costs. Much of the bag folding process has been automated, aiding in meeting the increased demand and helping to lower the costs. The process however is not fully automated. Generally an air bag is positioned on a surface with a reaction plate held by a fixture. The air bag is then folded into a compact bundle either automatically, or partially automatically. After the air bag has been folded, an operator must retain the folded air bag by placing a cover over it and attaching the cover to the reaction plate. The air bag is then removed from the holding fixture.

The greatest problem with this manual approach is inconsistency of the operation. The material of an air bag is fabricated of a resilient material that will generally not remain tightly folded, but will spring open unless held in position. After the bag is folded, the operator must hold the folded bundle so that it does not unfold as the cover is positioned. Often the operator does not retain the air bag uniformly, or may let the folded bag loose for some reason, requiring that the loosened or partially unfolded air bag be refolded by the operator prior to positioning the cover. The loosened folds, and non-uniformity resulting may adversely effecting the deployment of the air bag.

Besides effecting the uniformity and thus the quality of the folded air bag, employing an operator in this manner adds expense, and slows the folding operation, reducing the number of folded air bags produced.

It would be highly advantageous, therefore, to remedy the foregoing and other deficiencies inherent in the prior art.

Accordingly, it is an object of the present invention to provide improvements in air bag folding.

Another object of the invention is the provision of improvements especially adapted for use in connection with an automatic air bag folding apparatus.

And another object of the invention is to provide improved means for retaining.

Still another object of the immediate invention is the provision of an apparatus for automatically retaining a bag in a folded configuration as a cover is positioned.

Yet another object of the invention is to provide means for automatically retaining the folded air bag which is not removed until after the cover is positioned.

SUMMARY OF THE INVENTION

Briefly, to achieve the desired objects of the instant invention in accordance with a preferred embodiment thereof, provided is an improvement to an air bag folding apparatus having a holding fixture. The holding fixture supports a reaction plate and a folded air bag coupled to the reaction plate, in a position to receive an enclosing and confining cover. The improvements include retaining means for retaining the folded air bag in a folded configuration until after the enclosing cover is positioned to enclose and confine the folded air bag and the enclosing cover is coupled to the reaction plate.

In a further embodiment, a folded air bag retaining apparatus for retaining a folded air bag coupled to a reaction plate in a folded configuration during the positioning of a cover is provided. The folded air bag retaining apparatus includes a holding fixture for supporting the reaction plate and the folded air bag coupled to the reaction plate, in a position to receive the enclosing cover; and retaining means for retaining the folded air bag in a folded configuration until after the enclosing cover is positioned to enclose the folded air bag and the enclosing cover is coupled to the reaction plate.

The retaining means includes a flexible band having a first end and a second end, the flexible band being movable between a retracted position and an extended position overlying the folded air bag, and a clamp carried proximate a first edge of the holding fixture, configured to receive and releasably secure the first end of the flexible member in the extended position.

In a further embodiment, the apparatus includes a base, a spool rotatably mounted on the base for collecting and dispensing the flexible band into the retracted position and the extended position, respectively, the second end of the flexible band coupled to the spool, a guide track configured to slidably carry the flexible band, the guide track extending from the spool and having an open end positioned adjacent a second edge of the holding fixture opposite the first edge, drive means coupled to the spool for rotating the spool to collect and dispense the flexible band, and control means for actuating the drive means to rotate the spool to dispense and collect the flexible band.

Also provided is a method of producing an air bag module including the steps of providing an air bag coupled to a reaction plate in a folded configuration, positioning retaining means for retaining the folded air bag in the folded configuration, positioning a cover to enclose and confine the folded air bag in the retained folded configuration, and removing the retaining means. The step of positioning retaining means includes the steps of providing a flexible band having a first end and a second end, the flexible band being movable between a retracted position and an extended position, moving the flexible band to the extended position, overlying the folded air bag and fixing the first end adjacent the folded air bag. In a further embodiment, an additional step of tightening the flexible band about the folded air bag by partially retracting the flexible band is employed.

Removing the retaining means includes releasing the first end of flexible band, and withdrawing the flexible band out from between the folded air bag and the cover, to the retracted position.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view of a folded air bag retaining apparatus constructed in accordance with the instant invention, as it would appear mounted on a bag folding apparatus with portions broken away;

FIG. 2 is a sectional side view of a retained folded air bag as a cover is positioned;

FIG. 3 is a top view of the apparatus of FIG. 1 with portions of the bag folding apparatus broken away;

FIG. 13 is a perspective view illustrating the fixture for receiving an air bag;

FIG. 14 is a perspective view illustrating an air bag after being folded and held by a clamp member;

FIG. 15 is a perspective view illustrating flexible bands being extended;

FIG. 16 is a perspective view illustrating free ends of the flexible bands being positioned in a clamp;

FIG. 17 is a perspective view illustrating the free ends of the flexible bands being secured by the clamp;

FIG. 18 is a perspective view illustrating the flexible bands being partially retracted;

FIG. 19 is a perspective view illustrating the removal of the clamp member holding the folded air bag;

FIG. 20 is a perspective view illustrating positioning of a cover to enclose the retained folded air bag;

FIG. 21 is a perspective view illustrating the cover in position, and enclosing the retained folded air bag;

FIG. 22 is a perspective view illustrating the retraction of the flexible bands;

FIG. 23 is a perspective view illustrating removal of the folded air bag from the holding fixture;

FIG. 24 is a perspective view illustrating another embodiment of a clamp member used in combination with the folded air bag retaining apparatus illustrated in FIGS. 1-23;

FIG. 25 is a Perspective view illustrating the clamp member used in the embodiment illustrated in FIG. 24; and FIG. 26 is a sectional side view illustrating the clamp member lowered into position in contact with the folded air bag.

DETAILED DESCRIPTION OF THE PREFERRED EMBODIMENT

Figure 4:
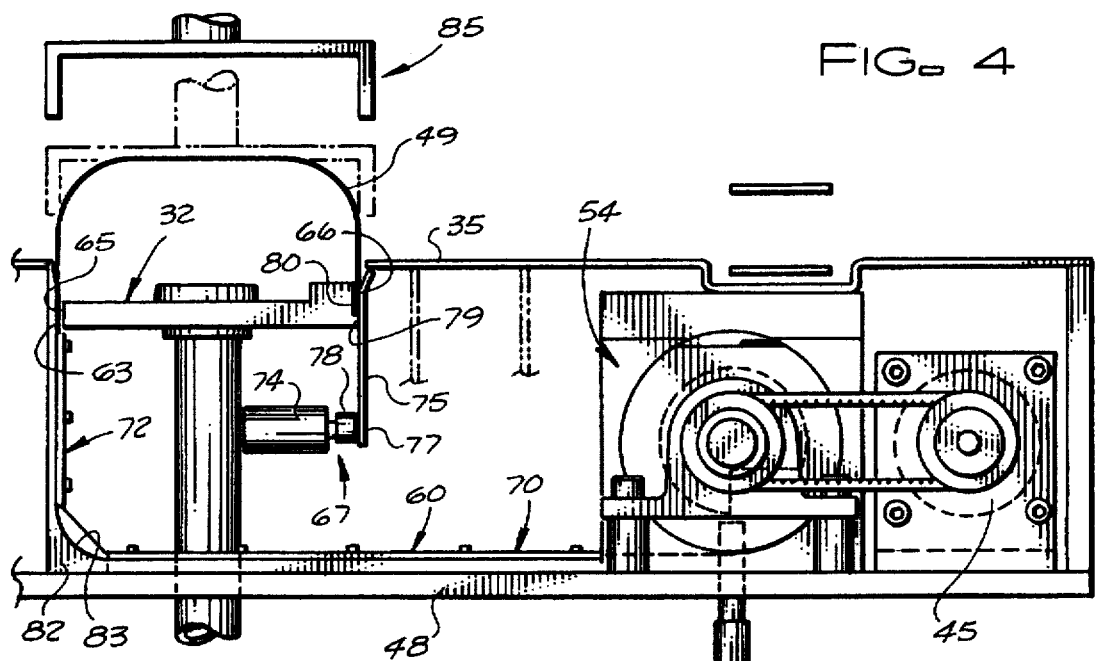
FIG. 4 is a side view of the folded air bag retaining apparatus.

Turning now to the drawings in which like reference characters indicate corresponding elements throughout the several views, attention is first directed to FIG. 1 which illustrates portions of a bag folding apparatus generally designated 30. Bag folding apparatus 30 includes a holding fixture 32 for receiving and retaining an air bag 33 (visible with reference to FIG. 2) and bag supporting means consisting of support members 34 and 35 positioned on opposing sides of holding fixture 32. Support members 34 and 35 provide a surface upon which air bag 33 is folded by associated elements such as blades 37, which operate in concert with support members 34 and 35, and elements not specifically shown.

While portions of an automatic bag folding apparatus are shown and described, substantially any automatic or manual bag folding apparatus may be used. Bag folding apparatus 30 is shown for purposes of orientation and reference in connection with the ensuing detailed description of the preferred embodiments of the instant invention. The foregoing brief description of a bag folding apparatus is intended to be generally representative of typical bag folding apparatus and is therefore not shown in detail. Details not specifically illustrated and described will be readily understood and appreciated by those skilled in the art.

Still referring to FIG. 1, a folded air bag retaining apparatus generally designated 40, is shown mounted to air bag folding apparatus 30. Folded air bag retaining apparatus 40 serves to retain air bag 33 in a folded configuration until after a cover 43 has been positioned. Cover 43 includes a top panel 41 and sidewalls 42 depending therefrom, defining a cavity 46 for receiving and confining folded air bag 33. Folded air bag retaining apparatus 40 includes a retaining assembly 44, drive means which in this embodiment includes a motor 45, and control means including a switch assembly 47 for controlling the operation of motor 45. In this embodiment, the elements of folded air bag retaining apparatus 40 are carried by a base 48 underlying and acting as a support structure for bag folding apparatus 30.

Retaining assembly 44 includes retaining means, preferably including a pair of flexible bands 49 and 50, having ends 52 and 53 (not visible) attached to spool assemblies 54 and 55 respectively, and free ends 57 and 58. Spool assemblies 54 and 55 are actuated by a drive shaft 59 coupled to motor 45. Spool assemblies 54 and 55 collect and dispense flexible bands 49 and 50 moving flexible bands 49 and 50 between an extended and a retracted position respectively. With additional reference to FIG. 3, drive shaft 59 and motor 45 are positioned at a location spaced apart from holding fixture 32 to provide the space necessary for the operation of the various elements associated with bag folding apparatus 30, such as blades 37. Flexible bands 49 and 50 are slideably carried within parallel spaced apart guide tracks 60 and 62, each terminating in an open end 63 and 64. Guide tracks 60 and 62 extend from spool assemblies 54 and 55, passing under holding fixture 32 with open ends 63 and 64 positioned adjacent an edge 65 thereof.

In the retracted position, free ends 57 and 58 are proximate open ends 63 and 64 of guide tracks 60 and 62 respectively. In the extended position, flexible bands 49 and 50 are extended from open ends 63 and 64 of guide tracks 60 and 62 as indicated by phantom lines in FIG. 1. Flexible bands 49 and 50 in the extended position, being flexible, can be directed over folded air bag 33 with free ends 57 and 58 received and held by a clamp assembly 67 positioned adjacent an opposing edge 66 of holding fixture 32. Flexible bands 49 and 50 securely retain folded air bag 33 while cover 43 is positioned. Due to their flexible nature and unobtrusive configuration, flexible bands 49 and 50 do not inhibit the positioning of cover 43. After cover 43 is positioned, flexible bands 49 and 50 can be removed.

Referring to FIG. 2, holding fixture 32 is illustrated with an air bag module 68 held therein. Air bag module 68 consists of a reaction plate 69 received by holding fixture 32, folded air bag 33 coupled to the top surface of reaction plate 69, and cover 43, which encloses folded air bag 33 and engages reaction plate 69. It will be understood that folded air bag 33 is coupled to the top surface of reaction plate 69, and is therefore not enclosed or retained in the folded configuration by reaction plate 69. Cover 43 is positioned to enclose folded air bag 33 within cavity 46, confining and retaining it in the folded configuration prior to deployment. Flexible bands 49 and 50 are shown in a retaining or intermediate position, overlying and retaining folded air bag 33 in the folded configuration until after cover 43 encloses and confines folded air bag 33 in the folded configuration. Therefore, at no time is folded air bag 33 not retained in the folded configuration, preventing loosening of the folds which may result in non-uniform deployment. Flexible bands 49 and 50 are held in the retaining position by clamp assembly 67 which engages free ends 57 and 58. Clamp assembly 67 will be shown in greater detail in the following description.

Figure 5:
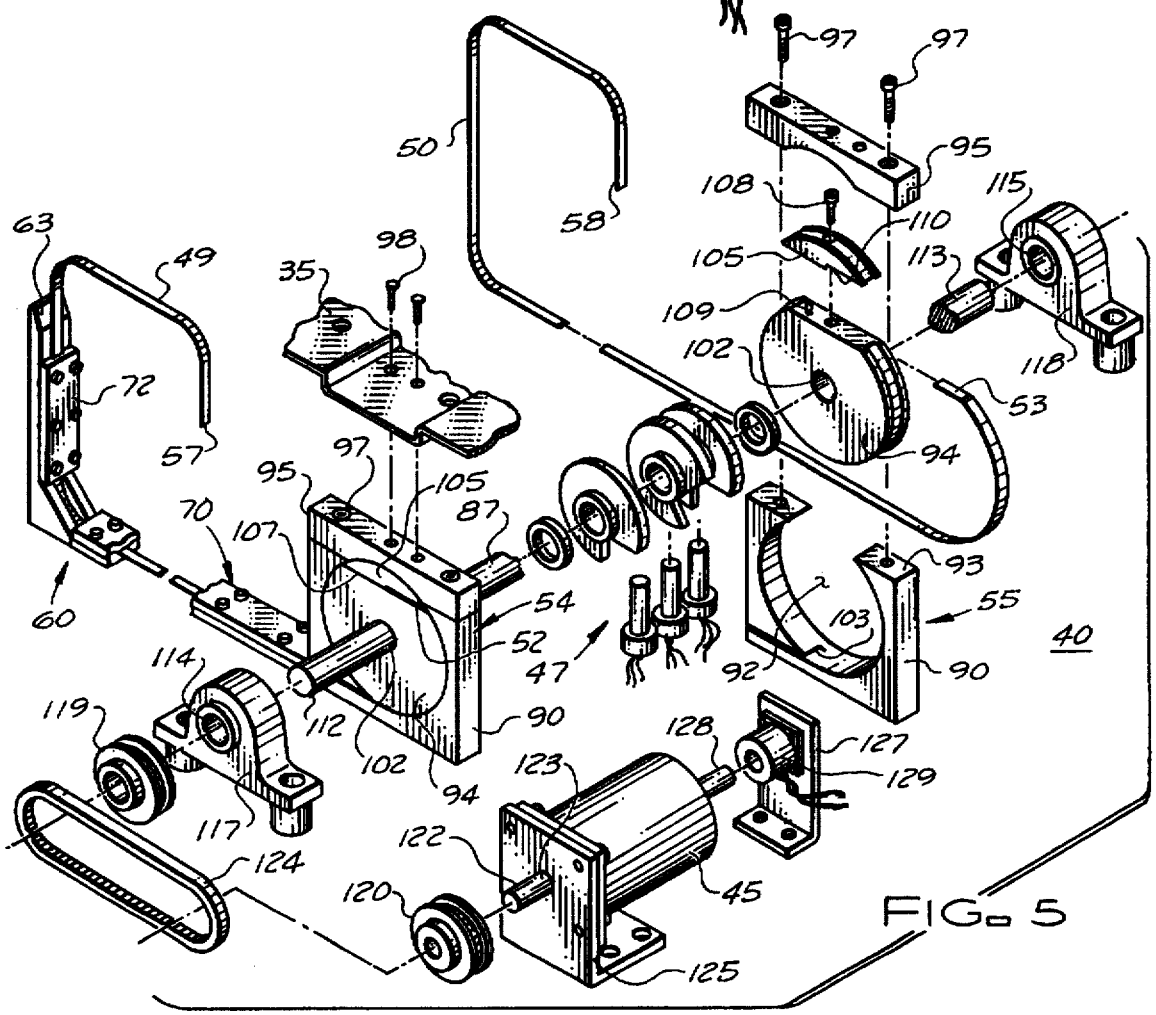
FIG. 5 is an exploded perspective view of the folded air bag retaining apparatus.

Referring now to FIG. 4 with additional reference to FIGS. 1 and 5, guide tracks 60 and 62 (only guide track 60 is visible in FIG. 4 and shown in FIG. 5) each consist of a horizontal portion 70 and a vertical portion 72. Horizontal portions 70 extend from spool assemblies 54 and 55, passing under holding fixture 32 and guiding flexible bands 49 and 50 substantially parallel to base 48 and directly away from spool assemblies 54 and 55. Upon passing under holding fixture 32, flexible bands 49 and 50 are guided by vertical portions 72 which extend perpendicular to base 48, terminating at open ends 63 and 64 adjacent an edge 65 of holding fixture 32. In the extended position, flexible bands 49 and 50 extend from open ends 63 and 64 and can be curved back on themselves to overlie holding fixture 32.

Figure 12:
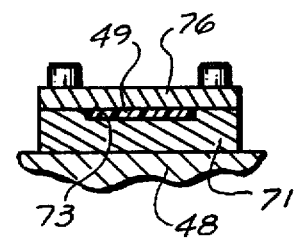
FIG. 12 is a sectional view taken along line 12—12 of FIG. 5.

Referring to FIG. 12, each of horizontal and vertical portions 70 and 72 of guide tracks 60 and 62 are formed of a trough shaped base 71 defining a channel 73 through which flexible bands 49 and 50 move. To retain flexible bands 49 and 50 within channels 73, a cover 76 is coupled to the top of each trough shaped base 71 by attachment members, enclosing channel 73 and flexible bands 49 and 50.

Free ends 57 and 58 are received and retained by clamp assembly 67. Clamp assembly 67 consists of a guided cylinder 74 coupled to the underside of holding fixture 32 and a band clamp 75 coupled by an end 77 to a reciprocating piston 78 of guided cylinder 74. An outwardly directed shoulder 79 is formed in opposing edge 66 of holding fixture 32 adjacent band clamp 75, defining a notch 80. Notch 80 receives free ends 57 and 58, with shoulder 79 acting as a stop to insure insertion of free ends 57 and 58 to the correct depth. When guided cylinder 74 is extended, free ends 57 and 58 can be easily inserted into notch 80. After insertion, guided cylinder 74 is retracted moving band clamp 75 toward holding fixture 32, securely clamping free ends 57 and 58 and securing flexible bands 49 and 50 in the retaining position. While a guided cylinder is employed in this embodiment, one skilled in the art will understand that substantially any reciprocating motor and other clamping means may be employed.

Still referring to FIG. 4 with reference back to FIG. 1, flexible bands 49 and 50 are pushed along guide tracks 60 and 62 by spool assemblies 54 and 55. To prevent binding or other stoppage of flexible bands 49 and 50 at the junction of horizontal portions 70 and vertical portions 72, a corner member 82 having a curved surface 83 is provided which converts the horizontal motion of flexible bands 49 and 50 into a vertical motion. In the preferred embodiment, curved surface 83 has a radius of approximately two inches, which has been found to be ideal, allowing smooth movement of flexible bands 49 and 50 between the extended and retracted positions.

Often, bag folding apparatus 30 include a clamp member 85 which is vertically raised and lowered. Clamp member 85 is positioned directly over folded air bag 33, and as the final step of the folding process, is lowered to contact and retain folded air bag 33. Clamp member 85 does, however, interfere with the placement of cover 43, and thus, must be removed prior to positioning cover 43. Flexible bands 49 and 50 take up where clamp member 85 leaves off, securely retaining air bag 33 in a folded configuration during the positioning of cover 43.

Figure 6:
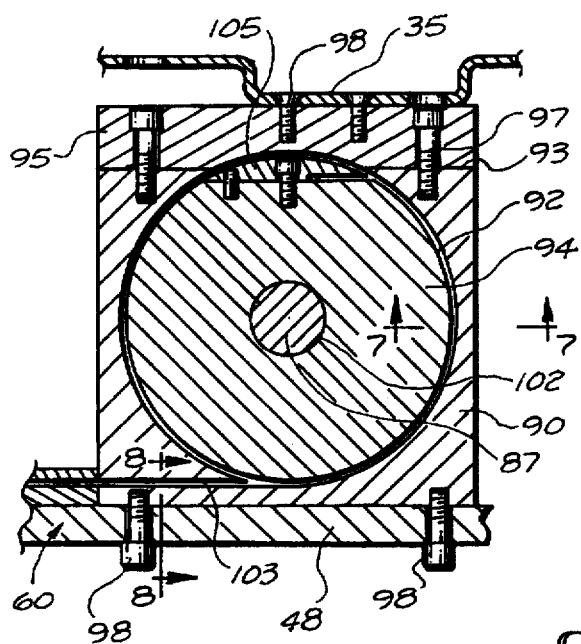
FIG. 6 is a sectional side view of a spool assembly.

Turning now to FIG. 5, flexible bands 49 and 50 are extended and retracted along guide tracks 60 and 62 by spool assemblies 54 and 55 coupled to a drive shaft 87 rotated by motor 45. With further reference to FIG. 6, spool assemblies 54 and 55 each include a case 90 having a circular space 92 centrally formed therein and a top surface 93 intersected by circular space 92. Since each of spool assemblies 54 and 55 are identical and each of flexible bands 49 and 50 are coupled thereto in an identical manner, only one will be described in detail. A spool 94 is rotatably carried by case 90 within circular space 92 and retained therein by an access block 95 attached to top surface 93 of case 90. Access block 95 closes the intersection of top surface 93 and circular space 92. Removable attachment members 97, such as bolts, screws and the like, extend through access block 95 and are threadably received by case 90. Case 90 can be fixedly mounted to base 48 and support member 35 by additional attachment members 98.

Figure 7:
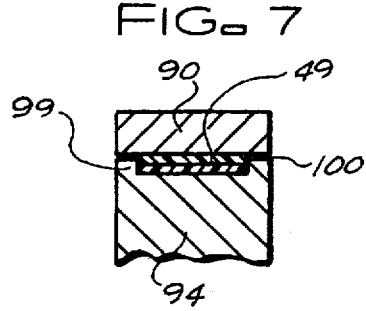
FIG. 7 is a sectional view taken along line 7—7 of FIG. 6.
Figure 8:
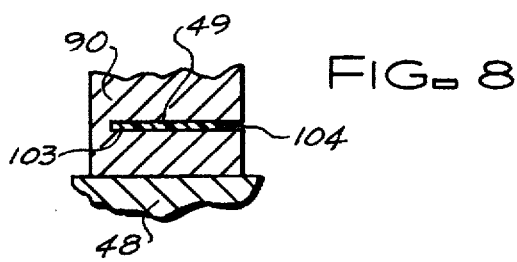
FIG. 8 is a sectional view taken along line 8—8 of FIG. 6.

With additional reference to FIG. 7, spool 94 is generally cylindrical, having a rim 99 and 100 at each end to retain flexible band 49 and an axial hole 102 for receiving drive shaft 87. Flexible band 49 is coupled to spool 94, and wound approximately one and one half times thereabout when collected in the retracted position. Flexible band 49 extends from spool 94, out of a slot 103 formed in case 90, into guide track 60. For ease in manufacturing, slot 103 is formed by making a cut 104 through one side as can be seen with additional reference to FIG. 8. Slot 103 conununicates with circular space 92, connecting circular space 92 and guide track 60. It will be understood that slot 103 need not be formed through a side of case 90, but may be wholly enclosed if so desired.

Figure 9:
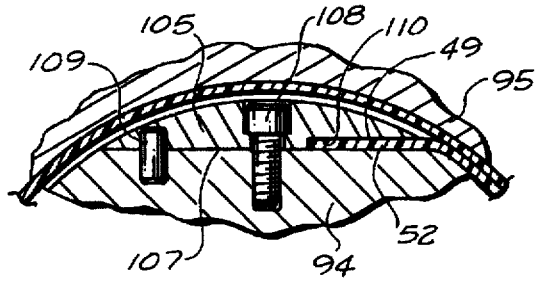
FIG. 9 is a sectional view of the clamping section of the spool assembly of FIG. 6.

Turning to FIG. 9, end 52 of flexible band 49 is fixed to spool 94 by a removable section 105 of spool 94 defined by a chord 107. Section 105 is removably attachable to spool 94 at chord 107 by a screw 108 counter set into section 105 so as not to inhibit rotation of spool 94. A pin 109 extends from section 105 spaced from screw 108, and is received by spool 94 to prevent rotation of section 105 relative spool 94. A notch 110 is formed in section 105 concurrent with chord 107 to receive end 52 of flexible band 49. End 52 is securely held between section 105 and spool 94. In the retracted position, flexible band 49 is wrapped approximately one and one half times about spool 94. In this manner, when flexible band 49 is fully extended (one full revolution of spool 94), notch 110 is not positioned near slot 103, thus insuring that flexible band 49 is not unintentionally pulled from between section 105 and spool 94.

Figure 10:
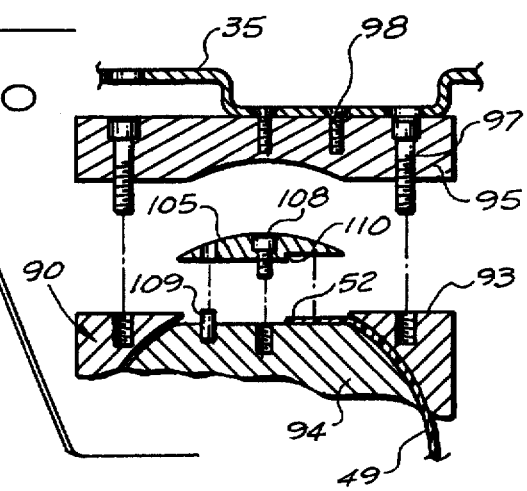
FIG. 10 is an exploded sectional side view of the top portion of the spool assembly.

After extended use, a flexible band may become worn or broken. To replace flexible band 49, access block 95 is removed permitting the removal of section 105 as is shown in FIG. 10. The worn or broken flexible band is then removed, and a new one installed. Flexible band 49 is threaded around spool 94, out slot 103 and into guide track 60. Section 105 is then replaced, securely clamping end 52. Access block 95 is replaced completing spool assembly 54. It will be understood by those skilled in the art that spool assembly 55 is constructed in the same manner, and that flexible band 50 is used and may be replaced in the same manner as that described above in connection with spool assembly 54 and flexible band 49.

Referring back to FIG. 5, drive shaft 87 extends between spool assemblies 54 and 55 with opposing ends 112 and 113 passing through axial holes 102. Ends 112 and 113 are each journaled within a bearing 114 and 115, carried by pillow blocks 117 and 118, respectively, mounted on base 48. End 112 extends through pillow block 117 and is coupled to motor 45 by coupling means, which in this embodiment includes a timing belt pulley 119 coupled to end 112, a timing belt pulley 120 coupled to an end 122 of a motor shaft 123 of motor 45, and a timing belt 124 coupled between pulleys 119 and 120. In this embodiment a 1:1 ratio is employed. Therefore, one revolution of motor shaft 123 turns drive shaft 87 one revolution. A timing belt is used because precise synchronization between motor shaft 123 and drive shaft 87 must be maintained. A smooth belt may allow slippage between the rotation of motor shaft 123 and drive shaft 87 losing synchronicity. While a timing belt 124 is utilized in this embodiment, one skilled in the art will understand that other drive means such as gears or the like may be employed.

Motor 45 is preferably an AC synchronous electric motor, providing power with low revolutions in both forward and reverse directions. Motor 45 is carried by brackets 125 and 127 mounted on base 48 and actuated by a control means not illustrated. In this embodiment, motor 45 is actuated by a foot operated switch (not shown), but it will be understood that control means may also actuate motor 45 as will be described in the following embodiment. End 122 of motor shaft 123 extends through bracket 125 and an opposing end 128 is received within an electric brake 129 carried by bracket 127. Electric brake 129 is preferably a 24 volt DC magnetic particle brake which is intended to stop rotation (lock-up of motor shaft 123.

Figure 11:
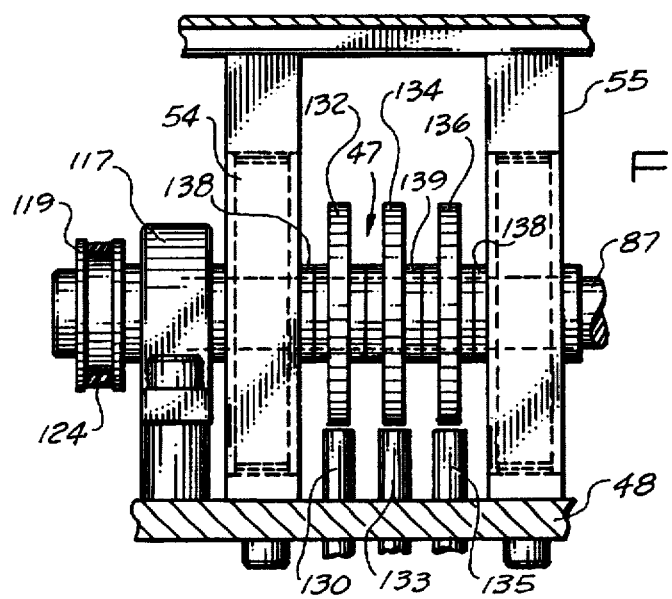
FIG. 11 is a partial sectional view illustrating the drive shaft and switch assembly which actuates the spool assemblies.

Operation of folded air bag retaining apparatus 40 is controlled by control means including a logic controller (not shown) such as a programmable logic controller (PLC) well known in the art, and a series of switches sending signals to the logic controller. With additional reference to FIG. 11 switch assembly 47 includes a retracted position switch 130 and corresponding cam 132, an intermediate position switch 133 and corresponding cam 134, and an extended position switch 135 and corresponding cam 137. Cams 132, 134 and 137 are carried by drive shaft 87 intermediate spool assemblies 54 and 55 and spaced therefrom by spacers 138. Additional spacers 139 are built integrally with cams 132, 134 and 137 to separate each from the other, and position them over switches 130, 133 and 135 respectively. Switches 130, 133 and 135 are carried by base 48 and remain motionless relative drive shaft 87. Switches 130, 133 and 135 are preferably proximity switches (induction type), but those skilled in the art will understand that other switches such as micro-switches, Hall effect switches or the like may be employed. The purpose of switches 130, 133 and 135 is to determine three separate positions of drive shaft 87, and thus the position of spools 94 within spool assemblies 54 and 55.

In operation switches 130, 133 and 135, brake 129, and motor 45 are each coupled to logic controller (not shown). In the retracted position, flexible bands 49 end 50 are wound one and one half times on spools 94. In the retracted position, retracted position cam 132 is oriented so that retracted position switch 130 is made. The term "made" is intended to indicated a predetermined position of the switch signaling that a specific condition or operation be met. In this instance, when a switch is made, it has been closed. Upon an appropriate signal, such as manipulation of a foot switch by an operator, or signal from the PLC, motor 45 is actuated. Motor 45 rotates drive shaft 87, dispensing flexible members 49 and 50, until extended position cam 137 is oriented so that extended position switch 135 is made. Extended position switch 135 send a signal to the PLC which stops motor 45. At the same time, the PLC will also switch motor 45 into reverse. In the extended position, retracted position switch 130 and intermediate position switch 133 are open. Cams 132, 134 and 137 can be oriented in various manners, but in this embodiment, extended position cam 137 and retracted position cam 132 are oriented so that one revolution of drive shaft 87 occurs.

Upon again actuating motor 45, drive shaft 87 is rotated, now in a reverse direction, until intermediate position switch 133 is made, signaling the PLC to stop motor 45. This is the retaining position, wherein flexible bands 49 and 50 have been tightened against folded air bag 33. It will also be understood that in some applications flexible band 49 and 50 need not be tightened against folded airbag 33. Extending bands 49 and 50 and inserting free ends 57 and 58 into clamp assembly 67 may be sufficient to adequately retain folded air bag 33. This would then be considered the retaining position. In this example, intermediate position switch 133 and associated elements would be unnecessary. At the same time, PLC activates electric brake 129, maintaining the tension on flexible bands 49 and 50. Upon a signal to start the motor 45, brake 129 is released and drive shaft 87 is rotated until retracted position switch 130 is closed, signaling the PLC to stop motor 45 and switch it into forward again, preparatory to another cycle. It will be understood that folded air bag apparatus may be fully automated, with the PLC or other control means starting motor instead of an operator.

Turning now to FIGS. 13–23, the process of retaining a folded air bag 33 and positioning cover 43 is illustrated. FIG. 13 illustrates flexible bands 49 and 50 in a retracted position and holding fixture 32 ready for receiving an air bag. FIG. 14 illustrates folded air bag 33 held by clamp member 85, prior to beginning the cycle and ready to be retained. The first step of the cycle is illustrated in FIG. 15, wherein motor 45 is actuated by an operator, moving flexible bands 49 and 50 to the extended position along arrowed lines A. In FIG. 16 an operator, designated by hand 140, positions free ends 57 and 58 into notch 80. Positioning of free ends 57 and 58 is unhindered by clamp member 85. The operator then actuates clamp assembly 67, moving band clamp 75 in the direction of arrowed line B, securing free ends 57 and 58 as illustrated in FIG. 17. Referring to FIG. 18, when securely clamped, the operator again actuates motor 45 which has been reversed, tightening flexible bands 49 and 50 about folded air bag 33 in a direction indicated by arrowed lines C and into the intermediate or retaining position. As discussed previously, this step may be omitted in some applications. At this point, clamp member 85 is removed in a direction indicated by arrowed line D, leaving flexible bands 49 and 50 to retain folded air bag 33 alone, as shown in FIG. 19.

Turning now to FIG. 20, it can be seen that without the presence of clamp member 85, positioning of cover 43 is not hindered. Furthermore, folded air bag 33 is tightly retained, allowing cover 43 to easily enclose it. Cover 43 is positioned in the direction of arrowed line E, enclosing folded air bag 33 and engaging reaction plate 69 as shown in FIG. 21. Referring to FIG. 22, motor 45 is again actuated, withdrawing flexible bands 49 and 50 from between cover 43 and folded air bag 33 into the retracted position, in the direction indicated by arrowed lines F. With reference to FIG. 23, completed air bag module 68 is removed from holding fixture 32, leaving holding fixture 32 ready to receive another air bag.

Turning now to FIGS. 24–26, an alternate embodiment of a clamp member 142 is shown. Used in combination with folded air bag retaining apparatus 40, clamp member 142 will provide additional automation to the present invention, eliminating the need for the operator to position flexible bands 49 and 50, and only requiring the operator to position cover 43 and remove air bag module 68.

Clamp member 142 includes guide tracks 143 and 144 coupled to opposing sides of a plate 145 having opposing vertical endwalls 146 and 147. Guide tracks 143 and 144 each have an end 148 and 149 positionable to match open ends 63 and 64 of guide tracks 60 and 62 respectively. Guide tracks 143 and 144 are trough shaped, through which flexible bands 49 and 50 easily slide, and each include a pair of vertical portions 150 and 152 coupled by a horizontal portion 153. To prevent binding or other stoppage of flexible bands 49 and 50, corners 154 and 155 are provided at the junction of horizontal portion 153 and vertical portions 150 and 152, respectively, of each guide track 143 and 144. Corners 154 and 155 have a curved surface 157 and 158 respectively, with corner 154 converting the vertical motion of flexible bands 49 and 50 into a horizontal motion, then corner 155 converting the horizontal motion back into a vertical motion again. When clamp member 85 is lowered into contact with folded air bag 33, vertical portions 150 align with open ends 63 and 64, and vertical portions 152 align with notch 80. Thus, upon extension of flexible members 49 and 50, free ends 57 and 58 automatically travel around folded air bag 33 and are positioned in notch 80. Additionally, pins 159 extend from each corner of clamp member 142 and are received in apertures 160 formed in support members 34 and 35 proximate holding fixture 32. Pins 159 insure proper alignment and add stability to clamp member 142.

Folded air bag retaining apparatus 40 will operate as described above wherein a logic controller actuates the necessary elements such as motor 45 upon receiving designated signals from switch assembly 47. For example, upon a signal that the bag folding process is complete, motor 45 will be automatically actuated, extending flexible bands 49 and 50. Free ends 47 and 48 travel over folded bag 33, passing along tracks 143 and 144. After full extension of flexible bands 49 and 50, free end 47 and 48 have been automatically inserted into notch 80 by clamp member 42. When extended position cam 137 is oriented to make extended position switch 135, switch 135 signals the PLC to activate guided cylinder 74 to move band clamp 75 against free ends 57 and 58, and then to reverse motor 45. When intermediate position cam 135 is oriented to make intermediate position switch 133, a signal is sent to the PLC to stop motor 45 and retract clamp member 142. After the operator positions cover 43, the final portion of the cycle is completed, removing flexible bands 49 and 50. The operator can then remove air bag module 68 preparatory to another cycle.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of producing an air bag module comprising the steps of:

providing an air bag coupled to a reaction plate in a folded configuration;

positioning retaining means to retain the folded air bag in the folded configuration, including providing a flexible band having a first end and a second end, the flexible band being movable between a retracted position and an extended position, moving the flexible band to the extended position, overlying the folded air bag and fixing the first end adjacent the folded air bag;

positioning a cover to enclose and confine the folded air bag in the retained folded configuration; and removing the retaining means.

2. A method as claimed in claim 1, wherein the step of positioning retaining means further includes the step of tightening the flexible band about the folded air bag by partially retracting the flexible band.

3. A method as claimed in claim 2, wherein the step of removing the retaining means includes:

releasing the first end of the flexible band; and withdrawing the flexible band out from between the folded air bag and the cover, to the retracted position.

4. A method as claimed in claim 3, wherein the step of positioning the cover includes:

providing a cover defining a cavity;

placing the cover with the folded air bag received within the cavity; and coupling the cover to the reaction plate.

5. A method as claimed in claim 3, wherein the step of moving the flexible band to the extended position includes:

providing a spool for collecting and dispensing the flexible band;

providing drive means for actuating the spool to collect and dispense the flexible band; and controlling the drive means to actuate the spool to dispense the flexible band.

6. A method as claimed in claim 5, wherein the step of withdrawing the flexible band out from between the folded air bag and the cover includes controlling the drive means to actuate the spool to collect the flexible band.

7. A method as claimed in claim 6, wherein the step of tightening the flexible band includes controlling the drive means to actuate the spool to collect the flexible band.

8. A method as claimed in claim 3, wherein the step of fixing the first end includes:

providing a clamp assembly including a clamp member movable between an open position and a closed position by a motor coupled thereto;

inserting the first end into the clamp assembly; and actuating the motor to move the clamp member into the closed position.

9. A method as claimed in claim 8, wherein the step of releasing the first end includes actuating the motor to move the clamp member into the open position.

* * * * *